(No Model.) 2 Sheets—Sheet 2.
R. NOLEN.
HUB.
No. 348,635. Patented Sept. 7, 1886.
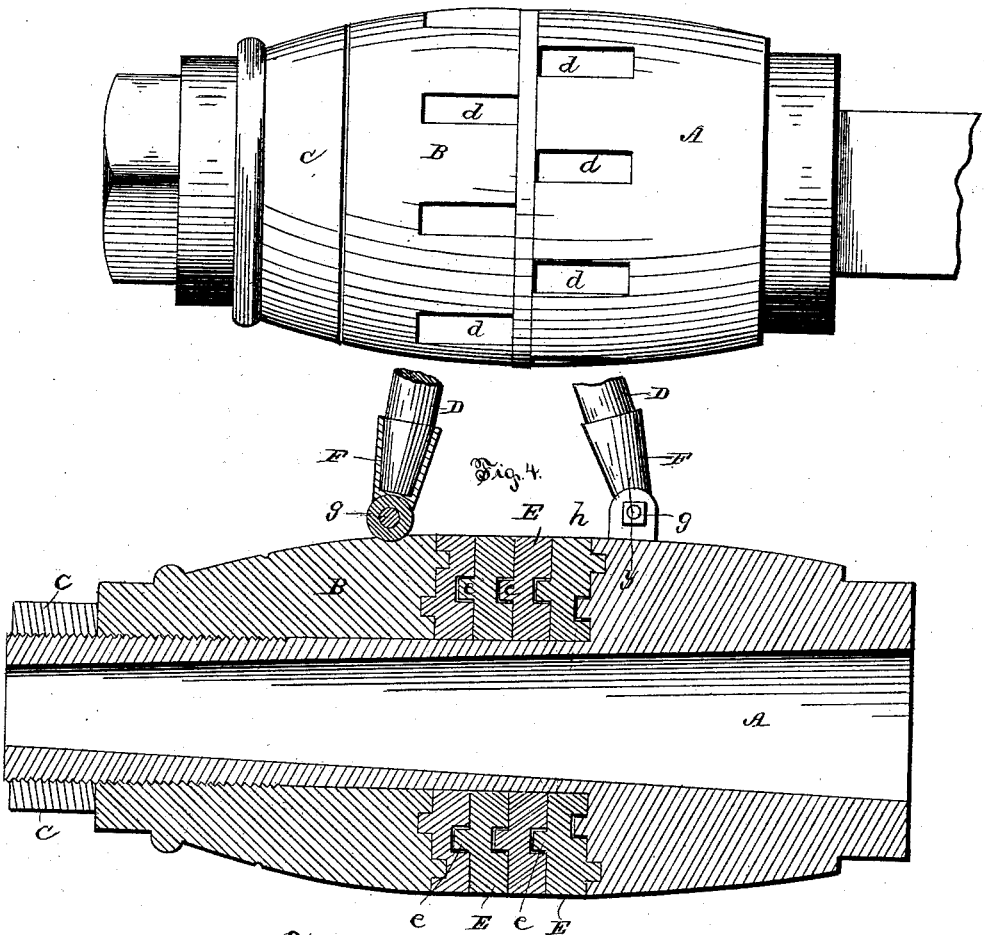
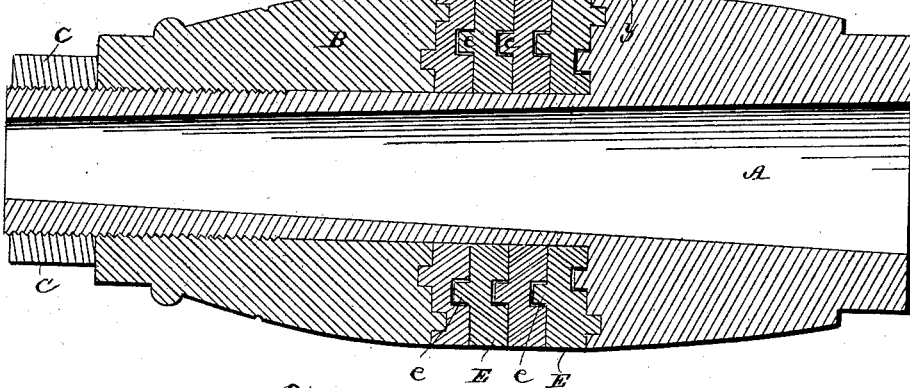
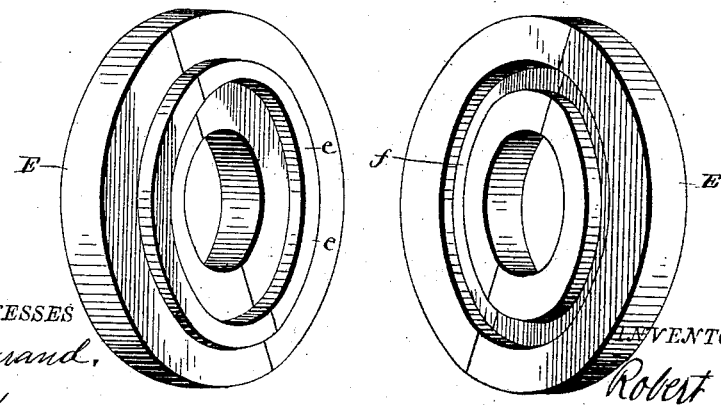
WITNESSES
F. L. Durand,
Wm. R. Kennedy.
INVENTOR
Robert Nolen
By P. T. Dodge
Attorney

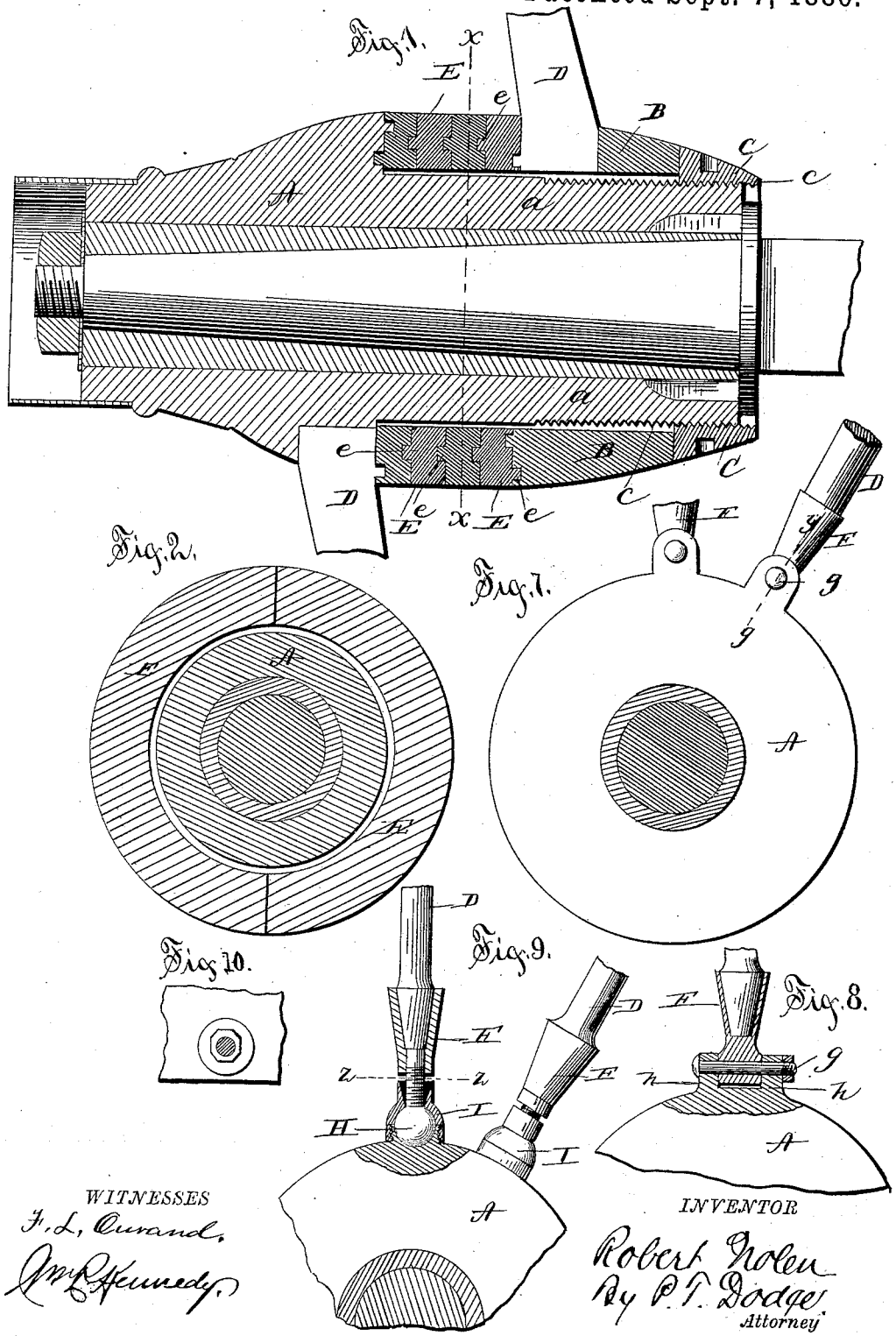

UNITED STATES PATENT OFFICE.

ROBERT NOLEN, OF COLORADO, TEXAS, ASSIGNOR OF TWO-THIRDS TO O. F. RODGERS AND A. P. BRUSH, JR., BOTH OF SAME PLACE.

HUB.

SPECIFICATION forming part of Letters Patent No. 348,635, dated September 7, 1886.

Application filed July 21, 1886. Serial No. 208,623. (No model.)

*To all whom it may concern:*

Be it known that I, ROBERT NOLEN, of Colorado, in the county of Mitchell and State of Texas, have invented certain Improvements in Hubs, of which the following is a specification.

The special aim of my invention is to so construct a wheel that the spokes and the felly may be readily tightened at will, and the spokes conveniently removed and replaced by others, if required.

To this end it consists, essentially, in combining with staggered spokes a divided hub, the two parts of which receive the alternate spokes, and in combining with said parts a nut by means of which they may be forced together, and a series of removable washers filling the spaces between the two parts; also, in connecting the inner ends of the spokes to the hub by joints adapted to permit their ready adjustment, but give them a firm support, as hereinafter explained.

As certain of my improvements are applicable to hubs in which the spokes are seated in mortises, as well as to those in which the spokes are jointed to the hub, I have shown both constructions in the accompanying drawings.

Referring to the accompanying drawings, Figure 1 represents a longitudinal vertical section of a mortised hub constructed on my plan. Fig. 2 is a cross-section of the same on the line $x\ x$. Fig. 3 is a side view of the same. Fig. 4 is a longitudinal vertical section of the hub, having the spokes hinged thereto. Figs. 5 and 6 are perspective views of one of the removable washers, as seen from the opposite side. Fig. 7 is an end elevation of the hub shown in Fig. 4. Fig. 8 is a cross-section on the line $y\ y$ of Figs. 4 and 7, showing the hinge by which the spoke-socket is attached to the hub. Fig. 9 is an elevation, partly in section, showing the ball-and-socket joint for the same purpose. Fig. 10 is a cross-section on the line $z\ z$ of the preceding figure.

Referring to the drawings, A and B represent two main parts of the hub, which is made, externally, of ordinary form, but divided midway of its length into two parts.

In Figs. 1, 2, and 3, the part A is constructed with a central tubular neck or sleeve, $a$, which is extended through the portion B, and provided at its outer end with an external thread, $c$, which receives a collar or nut, C. This nut or collar acts against the outer end of the portion B, for the purpose of urging and holding the same inward.

D represents the spokes, which are staggered or arranged in a zigzag line at their inner ends, in a manner familiar to persons skilled in the art. These spokes are inserted in mortises $d$, formed for the purpose in the parts A and B, alternately. Owing to this arrangement it follows that when the part B is urged inward by the nut, the inner ends of the spokes therein are urged toward the ends of the spokes in the part A, the result being that the outer ends of the spokes are forced outward toward the felly, so that the spokes and the felly are both tightened at one operation.

In order to fill the space which would otherwise exist between the inner faces of the parts A and B, I provide a series of removable washers or rings, E, which are arranged side by side around the neck $a$ and between the faces of the parts A and B, their outer edges being flush with the surface of the hub. These collars or rings are divided each into two semicircular parts, in order to admit of their removal without entirely separating the main parts of the hub. In order to retain them securely in position, each ring is provided on one side with an annular flange, $e$, and on the opposite side with an annular groove, $f$, the flange of each ring fitting into the groove of the next. The faces of the body portions A and B are also provided with annular grooves in like manner, to engage the rings, as shown in Fig. 1. While the mortises may be used, as above, with good effect, I prefer to connect the spokes to the hub by means of joints, which will permit them to adjust themselves to the changing positions of the parts A and B.

The preferred form of joint is shown in Figs. 4, 7, and 8, in which F represents a metal socket adapted to receive one end of a spoke, and mounted at its inner end on a pivot, $g$, seated in ears $h$, formed on or attached to the outside of the hub. I prefer to cast each section of the hub-body complete in one piece with the ears thereon. The pivots lie at right angles to the axis of the hub, and thus maintain a close connection between the spokes and the hub, while permitting the former to change their angle as the two parts of the hub are brought together.

In Fig. 9 the socket F is mounted on a screw having a spherical head, H, seated in a socket in the periphery of the hub and secured therein by a collar, I.

Having thus described my invention, what I claim is—

1. In a wheel-hub, the combination of the body-section A, having the threaded neck $a$, and fitted to carry one half of the spokes, the body-section B, seated on the neck $a$, and fitted to carry the other half of the spokes, the nut C, and the removable washers interposed between the body-sections A and B.

2. In combination with the transversely-divided hub, the intermediate divided washers.

3. In combination with the hub-body divided transversely, the intermediate washers provided with interlocking flanges and grooves, as described.

4. In combination with the hub-body consisting of the parts A and B and the adjusting-nut, the spokes jointed to the body-sections, as described.

In testimony whereof I hereunto set my hand, this 20th day of July, 1886, in the presence of two attesting witnesses.

ROBERT NOLEN.

Witnesses:
SIDNEY P. HOLLINGSWORTH,
ANDREW PARKER.